United States Patent
Braun et al.

(10) Patent No.: US 6,739,319 B2
(45) Date of Patent: May 25, 2004

(54) FUEL SUPPLY DEVICE OF AN INTERNAL COMBUSTION ENGINE WITH A FUEL FILTER

(75) Inventors: Hans-Peter Braun, Renfrizhausen (DE); Stefan Woerz, Vaihingen/Enz (DE); Thomas Wieland, Stuttgart (DE); Christian Ast, R. Ant. Joaquim (BR); Erwin Franieck, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/203,019

(22) PCT Filed: Nov. 30, 2001

(86) PCT No.: PCT/DE01/04501

§ 371 (c)(1),
(2), (4) Date: Nov. 18, 2002

(87) PCT Pub. No.: WO02/46598

PCT Pub. Date: Jun. 13, 2002

(65) Prior Publication Data

US 2003/0127075 A1 Jul. 10, 2003

(30) Foreign Application Priority Data

Dec. 5, 2000 (DE) .......................................... 100 60 294

(51) Int. Cl.⁷ .............................................. F02M 37/10
(52) U.S. Cl. ....................... 123/509; 123/510; 220/562; 220/4.14
(58) Field of Search ........................ 123/509; 137/565; 220/562, 4.14

(56) References Cited

U.S. PATENT DOCUMENTS

| 5,782,223 A | * | 7/1998 | Yamashita et al. .......... 123/510 |
| 6,332,555 B1 | * | 12/2001 | Stangier ..................... 220/562 |
| 6,405,753 B1 | * | 6/2002 | Beyer et al. ................. 137/592 |
| 2001/0050104 A1 | * | 12/2001 | Nishi et al. ................. 137/202 |

FOREIGN PATENT DOCUMENTS

| EP | 0 612 919 A | 8/1994 |
| EP | 0 861 682 A | 9/1998 |

* cited by examiner

Primary Examiner—Thomas N. Moulis
(74) Attorney, Agent, or Firm—Ronald E. Greigg

(57) ABSTRACT

A fuel delivery device including a closure element, which closes an opening of a fuel tank and has a cup-shaped receptacle, which opens toward the outside of the fuel tank, contains the fuel filter, and can be closed by a cover element, which can be detachably fastened to the closure element. An elastic sealing ring, which is clamped between the closure element and the cover element, seals the receptacle. In the vicinity of the sealing ring, the closure element has at least one opening via which the receptacle communicates with the interior of the fuel tank. When the cover element is fastened onto the closure element, the sealing ring, starting from a non-deformed original shape, is elastically deformed in such a way that it closes the at least one opening. When the cover element is detached from the closure element, the sealing ring returns to its original shape in which it unblocks the at least one opening. This produces a pressure relief into the interior of the fuel tank when the cover element is detached.

8 Claims, 2 Drawing Sheets

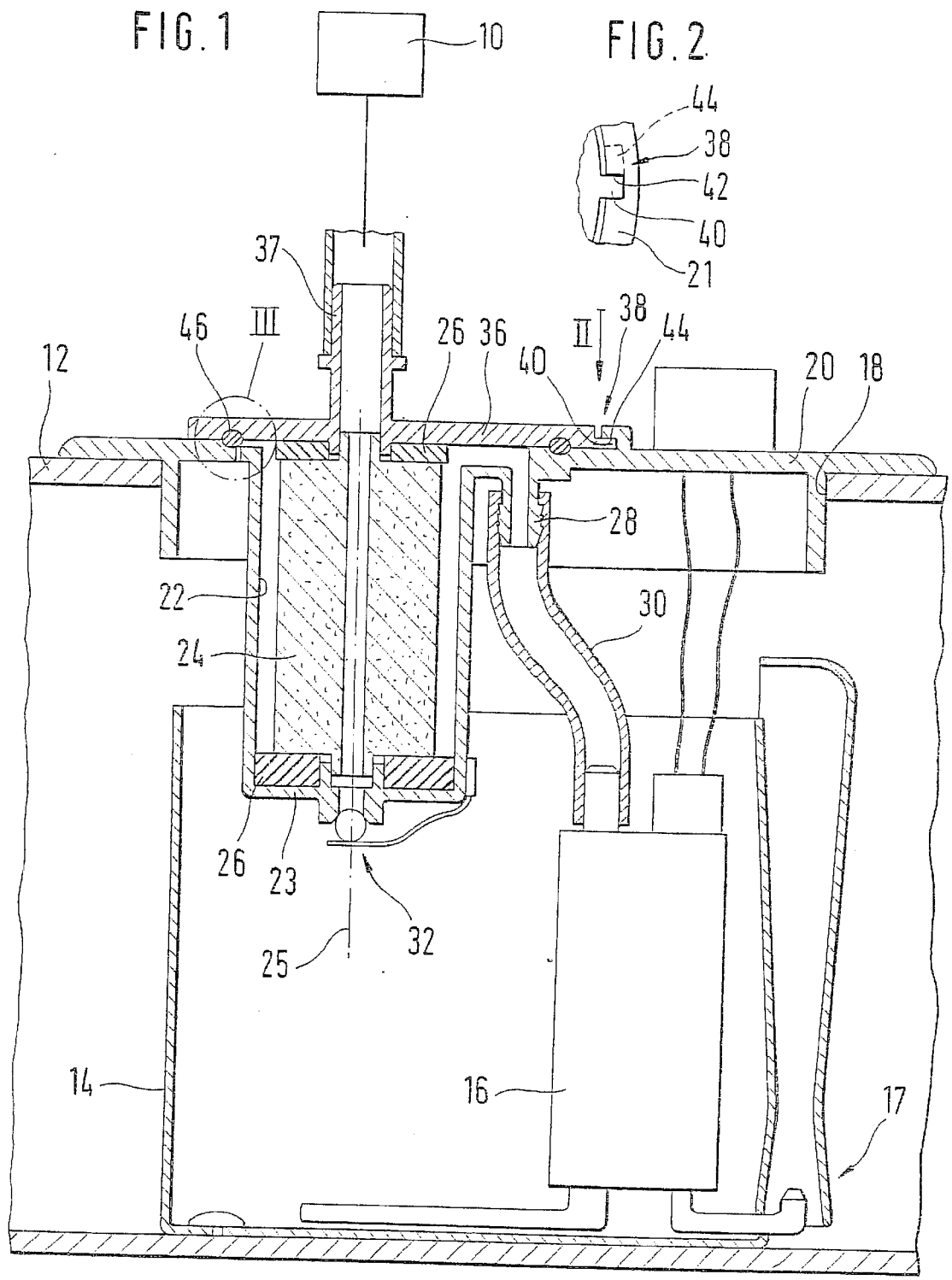

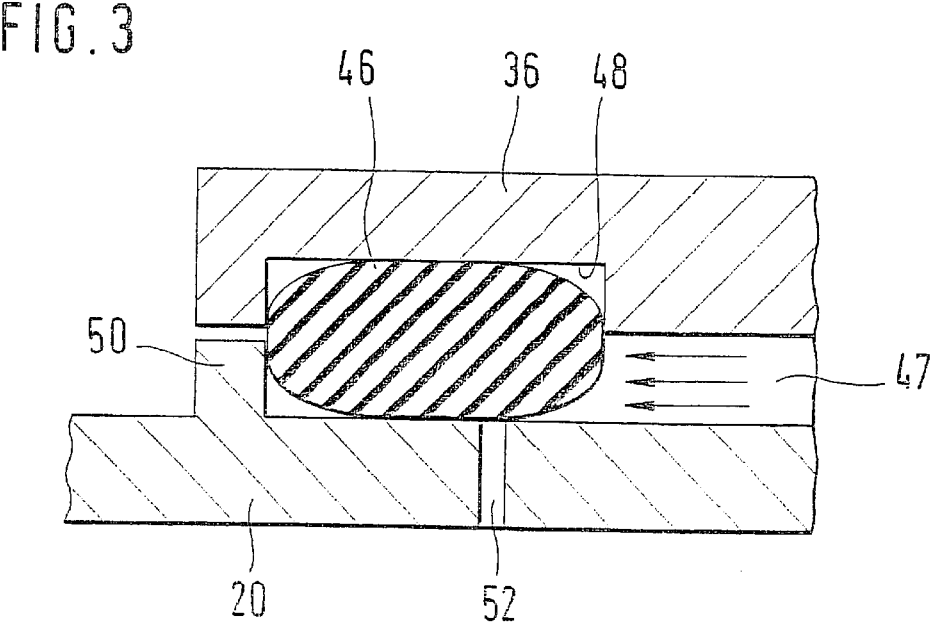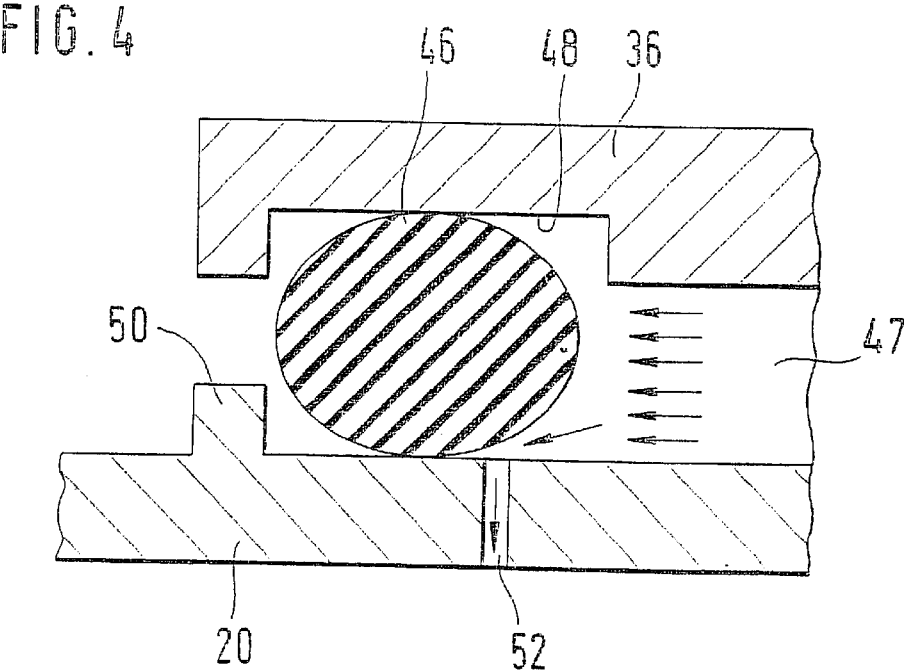

FUEL SUPPLY DEVICE OF AN INTERNAL COMBUSTION ENGINE WITH A FUEL FILTER

CROSS-REFERENCE TO RELATED APPLICATIONS

This is a 35 USC 371 application of PCT/DE01/04501 filed on Nov. 30, 2001.

BACKGROUND OF THE INVENTION

1. Field of the Invention

The invention is based on a fuel supply device of an internal combustion engine with a fuel filter, and particularly to such device including a closure element closing an opening in a fuel tank and having a cup-shaped receptacle containing the fuel filter.

2. Description of the Prior Art

EP 0 612 919 A1 has disclosed a fuel supply device having a closure element, which closes an opening of a fuel tank and which has a cup-shaped receptacle into which the fuel filter is inserted. The receptacle can be closed from the outside of the fuel tank by means of a cover element, which can be detachably fastened to the closure element. An elastic sealing ring is clamped between the cover element and the closure element and seals the receptacle. Fuel, which is supplied to the internal combustion engine under pressure by a delivery unit, flows through the fuel filter. The pressure in the delivery system is usually maintained even when the delivery unit is not running; this pressure also prevails in the fuel filter receptacle. When the fuel filter is replaced, for which the cover element is detached from the closure element, pressurized fuel can escape, which is a danger to the person who is replacing the filter and also represents a fire hazard.

SUMMARY OF THE INVENTION

The fuel supply device according to the invention has the advantage over the prior art that when the cover element is detached from the closure element, the sealing ring unblocks the at least one opening connecting the receptacle to the interior of the fuel tank, which produces a pressure relief into the fuel tank so that no pressurized fuel escapes from the receptacle. There is therefore no danger to the person who is replacing the filter and no fire hazard.

BRIEF DESCRIPTION OF THE DRAWINGS

An exemplary embodiment of the invention is shown in the drawings and will be explained in detail in the subsequent description. In the drawings:

FIG. 1 schematically depicts a fuel supply device of an internal combustion engine, FIG. 2 shows a detail of the device in a view according to the arrow II in FIG. 1, FIG. 3 shows an enlargement of a detail labeled III in FIG. 1, with a cover element fastened in place, and FIG. 4 shows the detail when the cover element is detached.

DESCRIPTION OF THE PREFERRED EMBODIMENT

FIGS. 1 to 4 show a fuel supply device of an internal combustion engine 10 of a motor vehicle. The engine 10 has an injection system that injects fuel into the cylinders of the engine. The motor vehicle has a fuel tank 12 that contains a collecting receptacle 14. The collecting receptacle 14 contains a delivery unit 16, which is comprised of a pump part and a drive part in the form of an electric motor. When running, the delivery unit 16 aspirates fuel from the collecting receptacle 14 and supplies it under pressure to the internal combustion engine 10. A jet pump 17 delivers fuel from the fuel tank 12 into the collecting receptacle 14.

The fuel tank 12 has an opening 18, through which the collecting receptacle 14 can be inserted into it. The opening 18 is closed in a sealed fashion by a flange-like closure element 20, which is fastened to the fuel tank 12 in a manner that is not shown in detail. A cup-shaped receptacle 22 for a fuel filter 24 is embodied on the closure element 20 and points into the interior of the fuel tank 12. The receptacle 22 is open toward the outside of the fuel tank 12. The fuel filter 24 is inserted into the receptacle 22 from the outside of the fuel tank 12. The fuel filter 24 has an elastically deformable flange 26 at its upper and lower end. When the fuel filter 24 is inserted into the receptacle 22, its bottom flange 26 rest with initial stress in the radial direction against the circumference wall and the bottom 23 of the receptacle 22 and produces a seal there.

The side of the closure element 20 pointing into the interior of the fuel tank 12 is provided with a fitting 28, which communicates with the receptacle 22. The fitting 28 has a hydraulic line 30 slid onto it, which is connected to the outlet of the delivery unit 16. The fuel supplied by the delivery unit 16 travels through the line 30 and the fitting 28 to the dirty side of the fuel filter 24, which is formed between its outer circumference and the circumferential wall of the receptacle 22. The fuel flows through the fuel filter 24 in a radially inward direction, to its clean side. The flanges 26 of the fuel filter 24 produce a seal between the clean side and the dirty side. A pressure relief valve 32 can be disposed at the bottom 23 of the receptacle 22 and when a predetermined pressure on the clean side of the fuel filter 24 is exceeded, this pressure relief valve 32 opens and allows fuel to be discharged into the fuel tank 12. Preferably, the closure element 20 can be comprised of plastic and be produced by means of injection molding so that the receptacle 22 and the fitting 28 can be easily produced to be of one piece with it.

The receptacle 22 can be closed by a cover element 36, which can be detachably fastened to the closure element 20. For example, the cover element 36 can be fastened to the closure element 20 by means of a bayonet connection 38. The bayonet connection 38 can be embodied as a bayonet catch in which a number of bayonet hooks 40 are embodied distributed over the circumference of the cover element 36, only one of which is shown in FIGS. 1 and 2. The closure element 20 is provided with a flange 21, which has a number of radial recesses 42 embodied on its inner rim, corresponding to the number and arrangement of the bayonet hooks 40, and in the circumference direction adjacent to these recesses 42, ramps 44 are embodied on the inside of the flange 21 oriented toward the closure element 20. When the cover element 36 is fastened in place, it is placed onto the closure element 20 in the direction of the longitudinal axis 25 of the receptacle 22, in a rotational position in which its bayonet hooks 40 pass through the recesses 42, and then the cover element 36 is rotated into a locking position in which its bayonet hooks 40 slide onto the ramps 44, which causes the cover element 36 to be pulled toward the closure element 20 in direction of the longitudinal axis 25.

Alternatively, the cover element 36 can also be fastened to the closure element 20 by means of a screw connection. In this instance, the closure element 20 can have a with an external thread and the cover element 36 can have a shoulder with an internal thread, which is screwed onto the external thread of the closure element 20. When the cover element 36 is screwed in, it is pulled toward the closure element 20 in direction of the longitudinal axis 25 of the receptacle 22. It is also possible for a separate securing ring with an internal thread to be used, which encompasses the cover element 36 and is screwed onto the external thread of the closure element 20.

A fitting 37 is provided on the cover element 36, protruding outward from it; the cover element 36 is preferably comprised of plastic and is produced by means of injection molding and the fitting 37 is formed onto and of one piece with it. The cover element 36 rests against the upper flange 26 of the fuel filter 24 with an initial stress and consequently produces a seal between the clean side and the dirty side of the fuel filter 24. The clean side of the fuel filter 24 communicates with the fitting 37 to which a line leading to the internal combustion engine 10 is connected, through which the fuel supplied by the delivery unit 16 travels to the engine 10.

In order to seal the receptacle 22 in relation to the outside, an elastic sealing ring 46 is clamped between the cover element 36 and the closure element 20. The cover element 36 rests against the closure element 20 by means of the sealing ring 46 and radially inward from the sealing ring 46, an axial gap 47 remains between the cover element 36 and the closure element 20. For example, the cross section of the sealing ring 46 can have an original shape that is approximately circular and can be comprised of fuel-resistant rubber or elastomer. On its side oriented toward the closure element 20, the cover element 36 has a circumferential annular groove 48 in which the sealing ring 46 is disposed. On its side oriented toward the cover element 36, the closure element 20 has a circumferential annular rib 50, disposed opposite from the outer flank of the annular groove 48 of the cover element 36. In lieu of the annular rib 50, the closure element 20 can also have an annular groove, which is disposed opposite the annular groove 48 of the cover element 36. The closure element 20 has at least one opening 52 through which the receptacle 22 communicates with the interior of the fuel tank 12. The at least one opening 52 is disposed radially inside the sealing ring 46 and directly adjacent to it.

The sealing ring 46 is disposed between the closure element 20 and the cover element 36 and is clamped and therefore elastically deformed during the fastening of the cover element 36, due to the movement of the cover element 36 directed toward the closure element 20. FIG. 3 shows the cover element 36 in the position in which it is fastened to the closure element 20 and the sealing element 46 is in its elastically deformed state in which it is pressed flat and is consequently larger in the radial direction than in its original shape. In this elastically deformed state, the sealing ring 46 covers over the at least one opening 52 of the closure element 20 so that the receptacle 22 does not communicate with the interior of the fuel tank 12. The pressurized fuel supplied by the delivery unit 16 consequently flows through the fuel filter 24 and travels out through the fitting 37.

The pressure in the delivery system between the delivery unit 16 and the internal combustion engine 10 is maintained even when the engine 10 and the delivery unit 16 are not running. This permits a rapid starting of the engine 10. Consequently, there is always an overpressure in the receptacle 22 in comparison to the ambient pressure. Particles in the fuel flowing through the fuel filter 24, which are held back by the fuel filter 24 so that they do not travel into the engine 10, can cause the fuel filter 24 to become clogged, thus necessitating its replacement. This can be done easily by detaching and removing the cover element 36 from the closure element 20 so that the fuel filter 24 can be removed from the receptacle 22 and a new fuel filter can be inserted.

When the cover element 36 is detached from the closure element 20, it is moved away from the closure element 20 so that the sealing ring 46 returns to its approximately circular original shape, which is depicted in FIG. 4. In its original shape, the sealing ring 46 does not cover the at least one opening 52 of the closure element 20, thus unblocking it, allowing the receptacle 22 to communicate with the interior of the fuel tank 12 by means of the gap 47 and the at least one opening 52. In the process of detaching the cover element 36, the receptacle 22 is consequently pressure relieved into the interior of the fuel tank 12 by means of the at least one opening 52 so that in the subsequent removal of the cover element 36, no pressurized fuel can escape from the receptacle 22.

The foregoing relates to preferred exemplary embodiments of the invention, it being understood that other variants and embodiments thereof are possible within the spirit and scope of the invention, the latter being defined by the appended claims.

We claim:

1. A fuel supply device of an internal combustion engine comprising a fuel filter, a closure element (20) that closes an opening (18) of a fuel tank (12), a cup-shaped receptacle (22) opening toward the outside of the fuel tank (12) and containing the fuel filter (24), a cover element (36) closing the receptacle (22), the cover element being detachably fastened to the closure element (20), an elastic sealing ring (46) clamped between the closure element (20) and the cover element (36) and sealing the receptacle (22), the closure element (20) having at least one opening (52) in the vicinity of the sealing ring (46) via which the receptacle (22) communicates with the interior of the fuel tank (12), the sealing ring (46), starting from a non-deformed original shape, being elastically deformed in such a way that it closes the at least one opening (52) when the cover element (36) is fastened onto the closure element (20) and when the cover element (36) is detached from the closure element (20), the sealing ring (46) returns to its original shape in which it unblocks the at least one opening (52).

2. The device according to claim 1, wherein the cover element (36) and/or the closure element (20) has an annular groove (48) in which the sealing ring (46) is disposed.

3. The device according to claim 1, wherein the cover element (36) is fastened to the closure element (20) by means of a bayonet connection (38).

4. The device according to claim 2, wherein the cover element (36) is fastened to the closure element (20) by means of a bayonet connection (38).

5. The device according to claim 1, wherein the receptacle (22) is filled with pressurized fuel.

6. The device according to claim 2, wherein the receptacle (22) is filled with pressurized fuel.

7. The device according to claim 3, wherein the receptacle (22) is filled with pressurized fuel.

8. The device according to claim 4, wherein the receptacle (22) is filled with pressurized fuel.

* * * * *

UNITED STATES PATENT AND TRADEMARK OFFICE
CERTIFICATE OF CORRECTION

PATENT NO. : 6,739,319 B2
DATED : May 25, 2004
INVENTOR(S) : Hans-Peter Braun et al.

It is certified that error appears in the above-identified patent and that said Letters Patent is hereby corrected as shown below:

<u>Title page,</u>
Item [56], References Cited, U.S. PATENT DOCUMENTS, insert -- 4,159,063 A 6/1979 WEBER et al. --

Signed and Sealed this

Third Day of August, 2004

JON W. DUDAS
*Acting Director of the United States Patent and Trademark Office*